UNITED STATES PATENT OFFICE.

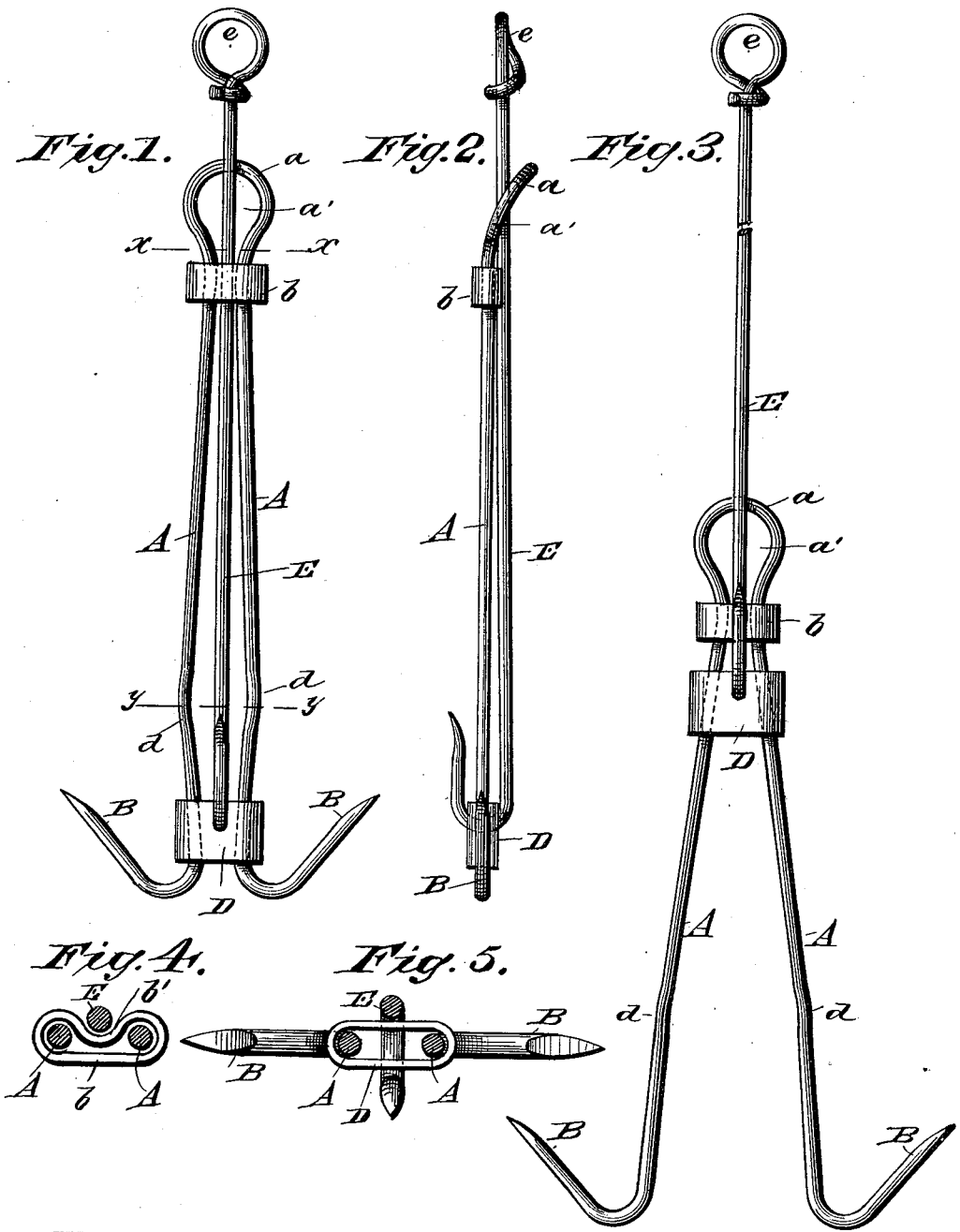

GEORGE SMITH, OF BROOKLYN, NEW YORK.

FISH-HOOK.

SPECIFICATION forming part of Letters Patent No. 387,015, dated July 31, 1888.

Application filed December 9, 1887. Serial No. 257,435. (No model.)

*To all whom it may concern:*

Be it known that I, GEORGE SMITH, of Brooklyn, in the county of Kings and State of New York, have invented a new and useful Improvement in Fish-Hooks, of which the following is a full, clear, and exact description.

My invention relates to an improvement in fish-hooks, and has for its object to provide a hook of simple construction which, when a fish grasps the same and attempts to escape, will expand in the mouth.

The invention consists in the construction and combination of the several parts, as will be hereinafter fully set forth, and pointed out in the claim.

Reference is to be had to the accompanying drawings, forming a part of this specification, in which similar letters of reference indicate corresponding parts in all the figures.

Figure 1 is a front elevation of the hook in position to receive the bait. Fig. 2 is a side elevation of the same. Fig. 3 is a front elevation illustrating the hook in an expanded position. Fig. 4 is a transverse section on line $x\,x$ of Fig. 1; and Fig. 5, a transverse section on line $y\,y$, also taken on Fig. 1.

In carrying out the invention a piece of suitable spring-wire is bent or doubled upon itself to form the twin shank A of the hook, and the two ends of the said shank are bent outward and upward in opposite directions to provide the hooks proper, B.

The upper end or head of the shank is curved in the direction of one side and at right angles to the hooks, as shown at $a$ in Fig. 2. Below the curved head $a$ the shank is embraced by a fixed collar, $b$, having a central longitudinal groove, $b'$, formed in one face, as shown in Fig. 4. This groove may, however, be omitted in small hooks, if desired, and also in hooks of large size, in which event the head $a$ is more decidedly curved. By reason of the collar $b$ a more or less oblong eye, $a'$, is formed in the head.

In the members of the shank A, below the center and near the hooks, a bow or curvature, $d$, is produced, the convexity being outward and the approaching inner concavities in horizontal alignment, as best illustrated in Fig. 1.

A sleeve, D, is held to slide upon the shank, purposed to hold the members in approximate contact with each other, and it will be observed by reference to Fig. 1 that when the sleeve is pressed downward below the bow portion $d$ of the shank the said bow will act in the capacity of a lock and prevent the expansion of the shank at the hook end unless the sleeve is forcibly drawn upward. When in this position, the hooks are adapted for the reception of bait.

In order that the shank may be permitted to automatically expand when the bait is taken by the fish and said fish attempts an escape, a rod, E, is secured to the sleeve, which rod is carried upward in contact with the grooved surface of the collar, if a groove is provided therein, and upward through the eye $a'$ a distance above the shank, terminating in a loop or eye, $e$, whereby the rod is readily attached to the line. I do not confine myself to the means shown for attaching the hook to a line, as any other equivalent or well-known means may be employed.

In operation the fish, having taken the bait, in its effort to escape will draw upon the hooks, whereupon the shank will be drawn through the sleeve, which action permits the shank to expand, as shown in Fig. 3, fastening the hooks more securely in the captive.

Having thus described my invention, what I claim as new, and desire to secure by Letters Patent, is—

In an expansible fish-hook, the combination, with the shanks A A, formed in one piece and having the eye $a$, bent at an angle to the general direction of the shanks, the collar $b$, inclosing said shanks, a rod, E, passing through the eye $a$, which, in connection with said collar $b$, forms a guide for said rod, and a collar, D, secured to the lower end of said rod and sliding on said shanks, substantially as described, and for the purposes set forth.

GEO. SMITH.

Witnesses:
   SAML. H. ANNIN,
   WILLIAM A. STAMM.